Figures 1, 2:
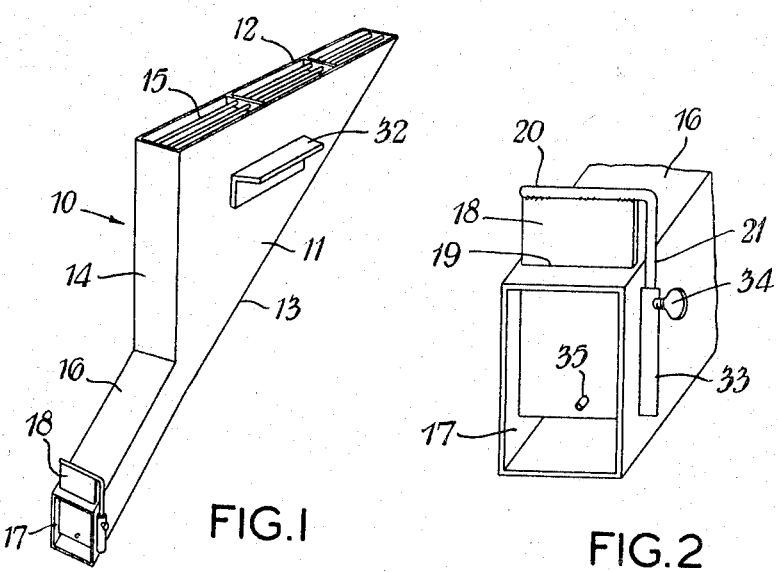

April 4, 1967  E. P. MARRIAGE  3,312,022
APPARATUS FOR THE BULK STORAGE OF PARTICULATE
MATERIAL SUCH AS GRAIN
Filed Jan. 27, 1965  2 Sheets-Sheet 1

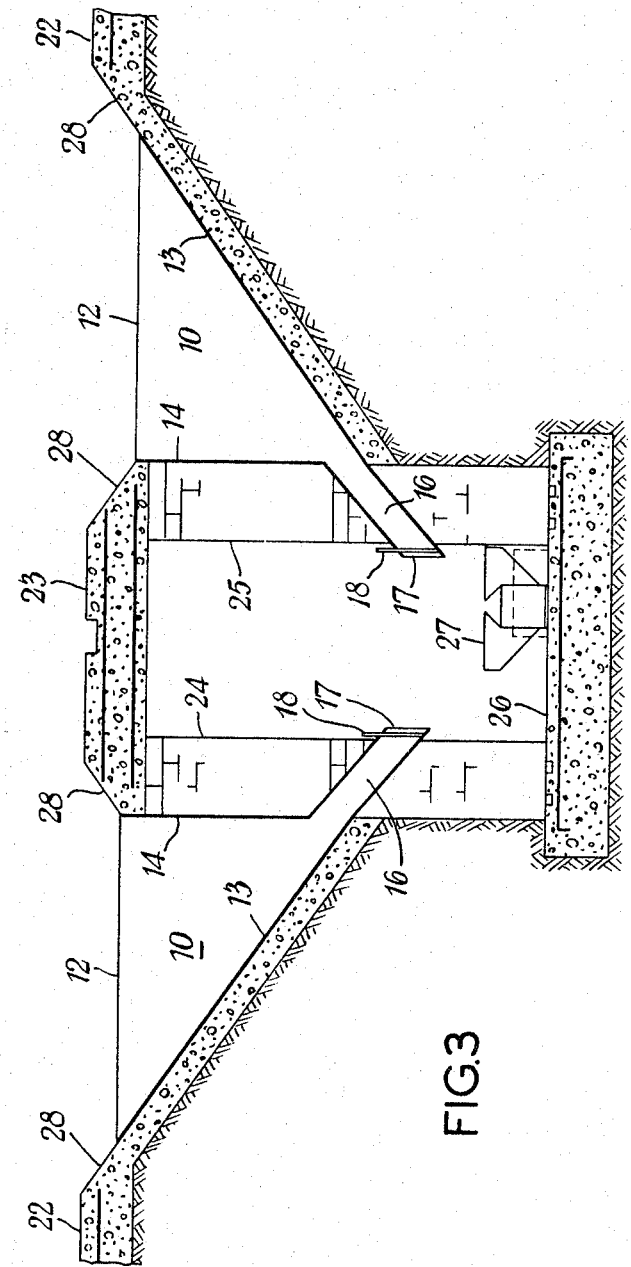

United States Patent Office 3,312,022
Patented Apr. 4, 1967

3,312,022
APPARATUS FOR THE BULK STORAGE
OF PARTICULATE MATERIAL SUCH
AS GRAIN
Edmund Patrick Marriage, Jerico Priory, Blackmore,
Ingatestone, England
Filed Jan. 27, 1965, Ser. No. 428,457
Claims priority, application Great Britain, Jan. 28, 1964,
3,566/64
3 Claims. (Cl. 52—169)

This invention relates to the bulk storage of particulate material and more particularly to improved means for discharging particulate material from the floor of a storage container such as a bin or hopper or an open floor area on which particulate material is stored. The invention will be described as applied to storage means for grain but it is to be understood that it is equally suited for other types of particulate material.

The invention is directed to a solution of the problems of discharging particulate material from a container or hopper the floor of which is at ground level. For storing large quantities of particulate material the most economical form of hoppering is to lay a concrete floor at ground level and erect upon the floor walls to provide a hopper of the required dimensions together with any desired partition walls. Apart from economy of manufacture the hopper having a floor at ground level has other advantages. For example, if the floor is flat, in whole or in part, it is possible for vehicles to drive in and out of the hopper and access is easier than in the case of an elevated hopper. However, an elevated hopper or like container is advantageous in that it is easier to provide a simple means whereby the particulate material may be discharged therefrom under gravity.

Hitherto hoppers having floors at ground level have been discharged manually, or by means of relatively expensive machinery such as auger conveyors. Alternatively, to discharge material from the hopper under gravity a trench has been provided alongside the hopper and the floor of the hopper has been sloped toward the trench and provided with a controlled aperture opening into the trench. Various kinds of conveyor means have been provided in the trench to receive material from the controlled aperture. This kind of hoppering, while having the advantage of easy emptying under gravity, presents problems of construction which add to its expense and detract from its utility.

For example it is difficult to construct in situ a discharge chute having an opening of limited size into the trench which is narrow throughout its depth yet provides the sloping surface necessary for effectual discharge of the particulate material under gravity from the hopper floor into the trench. Obviously the result of digging a hole in the hopper floor adjacent the trench wall is to produce a conical cavity which is of undesirably large area in the plane of the hopper floor, and which slopes inwardly toward the apex of the cone rather than toward the laterally disposed aperture in the trench wall.

It has therefore been the practice to provide shuttering in the hole and by this means construct with concrete a discharge chute of the desired right-angle triangle longitudinal section.

It is a principal object of the present invention to obviate much of the labor and consequent expense of the operation described above by the provision of a prefabricated discharge chute of the desired configuration, it being necessary merely to locate one of such prefabricated chutes in each hole dug in the hopper floor to provide the requisite number of discharge chutes for the hopper.

Furthermore the discharge chutes of the invention are prefabricated from a moisture-proof material with the result that no additional steps need be taken to ensure the water-proofing of the discharge chutes, as has been the case with the concrete chutes above described.

In summary the present invention simplifies hopper manufacture and effects a considerable economy while at the same time providing improved hoppering. The use of the prefabricated chutes of the invention results in a stronger hopper structure especially where, in accordance with one feature of the invention, the lateral walls of the prefabricated chute are provided with outwardly-extending lugs adapted to embed in concrete surrounding the chute.

Further objects, features and advantages of the present invention will be apparent from the following description of preferred embodiments thereof, which are given by way of example.

FIGURE 1 is a perspective view of a discharge chute in accordance with the invention, FIGURE 2 is a detail of the discharge chute of FIGURE 1, FIGURE 3 is a diagrammatic elevational view of storage means for particulate material such as grain incorporating the discharge chute of FIGURES 1 and 2, and FIGURES 4 and 5 diagrammatically illustrate alternative hopper constructions utilizing discharge chutes in accordance with FIGURES 1 and 2.

The discharge chute 10 illustrated in FIGURE 1 comprises a hollow body portion 11 of right angle triangle longitudinal section so as to have opposed lateral walls an hypotenuse side 13 and two orthogonal lesser sides 12 and 14. The lesser side 14 and the hypotenuse side 13 of the body 11 are closed, whereas the lesser side 12 is open to provide an elongate entrance aperture for the admission of particulate material into the body 11. Preferably and as shown the open side 12 of the body 11 is covered by a grille or grid 15.

At the junction of the lesser side 14 of body 11 with the hypotenuse side 13 a tube 16 extends from the body in continuation of the hypotenuse side 13. In the preferred embodiment illustrated the bottom of the rectangular section tube 16 is in the plane of the hypotenuse 13, but the expression "in continuation" in the above context is to be taken to mean merely that there is no step or other obstruction is between the hypotenuse side 13 of the body 11 and the tube 16, the bottom of the tube merging with the hypotenuse side 13 either in a common plane, as shown, or by a wide-radius curve.

The lateral walls of the body portion 11 of the chute 10 may be provided with at least one outwardly projecting lug 32 adapted to anchor in concrete laid to surround the chute, as will be later described.

The free end of the tube 16 is open to provide an exit aperture 17 for the discharge chute 10, the exit aperture being controlled by an adjustable shutter 18 movable in an opening 19 in the tube 16. The upper edge of the shutter 18 has a lip 20 to which is welded one limb of an L-shaped rod 21 the other limb of which is reciprocable in a tube 33 welded to the tube 16. A screw 34 is engaged in a threaded bore in the tube 33 and is adapted to engage the rod 21 to hold the latter at any desired position relative to the tube 33 and consequently to hold the shutter 18 at any desired position relative to the tube 16. The lower end of the shutter 18 is provided with a projection 35, such as a split pin located in a hole in the shutter, adapted to prevent removal of the shutter 18 from the tube 16.

Typical uses of the discharge chute 10 will now be described with reference to FIGURES 3, 4 and 5.

Hoppering for particulate material, such as grain, can be conveniently constructed in the following way. A trench is dug and provided with a concrete base 26.

Upon this base, side walls 24 and 25 may be built of brick, apertures being left in the walls 24, 25 for the insertion therethrough of the tubes 16 of the required number of discharge chutes 10. Where each discharge chute 10 is to be positioned earth is removed from the side of the walls 24, 25 remote from the trench so that each chute 10 can be located with its open lesser side 12 substantially at ground level and horizontal, its closed lesser side 14 in abutment a wall 24 or 25 and its tube 16 extending through the aperture provided in the wall for this purpose. Concrete is now laid to provide the floor for the hoppering, the concrete surrounding the open lesser side 12 of each chute 10 and preferably being suitably contoured to facilitate discharge of particulate material into the open side 12 of each chute 10. As shown in FIGURE 3, concrete may be laid beneath the hypotenuse side 13 of each chute 10, and the trench may be bridged by a cover 23 of concrete in the same plane as the remainder of the floor 22 of the hopper.

Walls may be built on or to surround the floor 22, 23 to provide one or more hoppers of any required dimensions. It will be obvious that the trench may be of any desired longitudinal extent and chutes 10 may be provided at any chosen spaced intervals along both sides of the trench.

If desired the floor 22, 23 may be flat throughout the greater part of its area, being provided with sloped portions 28 converging to each chute 10 only in a limited region surrounding the chute. In this case the hopper or hoppers will not be fully self-emptying, and it will be necessary to shovel some of the material retained on the flat area of the floor 22, 23 toward the sloped areas 28 in order completely to clear the hopper or hoppers of particulate material. A substantially flat floor may, however, be advantageous for some purposes.

Figure 4:
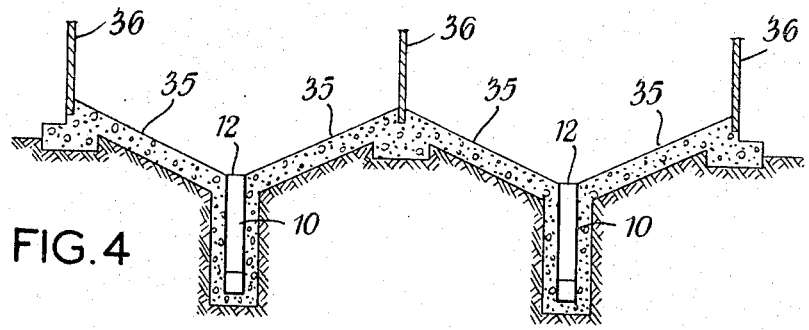
Figure 5:
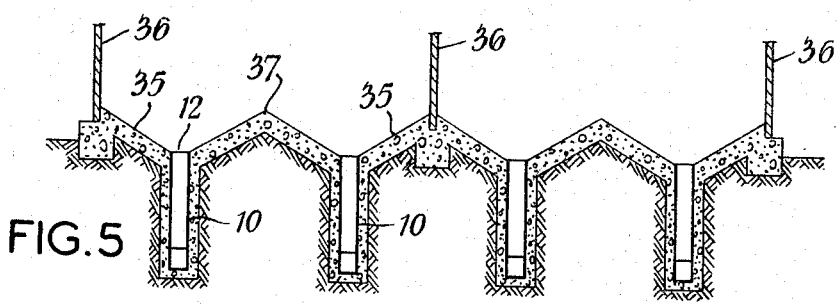

Alternatively, as illustrated in FIGURES 4 and 5, the whole floor area 35 of each of a series of adjacent hoppers separated by partition walls 36 may be sloped toward the open side 12 of a chute 10 located in the floor of each hopper. As illustrated in FIGURE 5 if each hopper defined by adjacent walls 36 has in its floor more than one chute 10, floor areas 37 between adjacent chutes 10 may be inclined towards each chute.

The base 26 of the trench (see FIGURE 3) may be provided with any suitable means for conveying particulate material discharged from the various chutes 10. Such conveyor means may take the form of rails (not shown) on which trucks 27 run along the length of the trench, or any suitable endless conveyor or auger conveyor means.

By utilizing discharge chutes in accordance with the invention in the construction of hoppering the hoppering is provided with economical moisture-proof outlet means which is easily assembled and which, furthermore, adds to the rigidity of the structure by its integration in the concrete flooring, the lugs 32 projecting from the sides of the slots anchoring in the concrete of the flooring and the closer lesser sides 14 of the chutes giving added support and rigidity to the walls 24 and 25 of the trench so that these walls may be mode economically built since the stresses to which they are subjected are reduced.

To avoid the use of relatively costly moisture-proof concrete it has been proposed to incorporate one or more layers of a moisture-proof plastics material between layers of concrete forming the floor of a hopper. Where this is done in a hopper incorporating the chute of the present invention it is necessary only to cut out of the plastics material an aperture to permit passage therethrough of the open side 12 of each discharge chute 10.

I claim:

1. Storage means for particulate material comprising at least one floor surface, a discharge area adjacent and below said floor and separated therefrom by a substantially vertical wall, and at least one discharge chute prefabricated from moisture-proof material and comprising a hollow body portion of substantially right-angle triangle longitudinal section, said body comprising elongate entrance aperture means for the admission of material thereinto extending longitudinally of one of the lesser sides of said body portion which is generally in the plane of said floor surface and extends from an aperture therein, and a tube extending from said body portion in the region of the junction between the other lesser side and the hypotenuse side of said body portion through said wall, said tube having an open free end positioned above said discharge area and provided with means for controlling the outflow of material through said tube, said other lesser side of said body portion being located in abutment with said wall.

2. Storage means for particulate material comprising a floor surface comprising water-impervious material, a trench adjacent said floor surface and at least one discharge chute prefabricated from moisture-proof material and comprising a hollow body portion of right-angle triangle longitudinal section recessed into the ground adjacent said trench so that one of the lesser sides of said body portion formed with entrance aperture means is generally in the plane of said floor surface and extends from an aperture therein, and a discharge tube extending from said body portion at the junction of the other lesser side thereof with the hypotenuse side thereof which tube has its open free end located over the bottom of the trench, said free end of said discharge tube being provided with means for controlling the outflow therefrom of particulate material.

3. Storage means as claimed in claim 2, wherein said floor surface is the floor of a grain hopper.

References Cited by the Examiner
UNITED STATES PATENTS

| | | | |
|---|---|---|---|
| 306,859 | 10/1884 | Posz | 52—197 X |
| 311,674 | 2/1885 | Pashley | 198—2 X |
| 548,823 | 10/1895 | Walker et al. | 52—192 X |
| 903,617 | 11/1908 | Suiter | 222—129 |
| 1,219,737 | 3/1917 | Heilig | 222—561 |
| 1,313,491 | 8/1919 | Lazzell | 222—561 |
| 1,313,852 | 8/1919 | Joyce | 222—129 |
| 1,342,094 | 6/1920 | Campbell | 193—2 X |
| 1,630,538 | 5/1927 | Micallef | 222—561 |
| 2,124,964 | 7/1938 | Klyver | 193—2 X |
| 2,887,759 | 5/1959 | Brownell | 52—742 |
| 2,947,568 | 8/1960 | Johnson | 222—561 X |
| 3,031,801 | 5/1962 | Levthesser | 52—742 |
| 3,124,906 | 3/1964 | Fegles | 214—17 |

RAPHAEL M. LUPO, *Primary Examiner.*